INVENTOR
HAROLD O. SEIGEL

Oct. 5, 1965　　　H. O. SEIGEL　　　3,210,652
METHOD OF GEOPHYSICAL PROSPECTING BY COMPARING THE STEADY STATE
MAGNETIC FIELD MEASURED DUE TO CURRENT FLOW THROUGH
A MEDIUM WITH THE TRANSIENT MAGNETIC FIELD MEASURED
AFTER TERMINATION OF THE CURRENT FLOW
Filed Dec. 26, 1961　　　　　　　　　　3 Sheets-Sheet 2

INVENTOR
HAROLD O. SEIGEL
BY: *Fetherstonhaugh & Co*
ATTORNEYS

Oct. 5, 1965  H. O. SEIGEL  3,210,652
METHOD OF GEOPHYSICAL PROSPECTING BY COMPARING THE STEADY STATE
MAGNETIC FIELD MEASURED DUE TO CURRENT FLOW THROUGH
A MEDIUM WITH THE TRANSIENT MAGNETIC FIELD MEASURED
AFTER TERMINATION OF THE CURRENT FLOW
Filed Dec. 26, 1961  3 Sheets-Sheet 3

INVENTOR
HAROLD O. SEIGEL
BY: *Fetherstonhaugh & Co*
ATTORNEYS

3,210,652
METHOD OF GEOPHYSICAL PROSPECTING BY COMPARING THE STEADY STATE MAGNETIC FIELD MEASURED DUE TO CURRENT FLOW THROUGH A MEDIUM WITH THE TRANSIENT MAGNETIC FIELD MEASURED AFTER TERMINATION OF THE CURRENT FLOW
Harold O. Seigel, 57 Glen Cedar Road, Toronto, Ontario, Canada
Filed Dec. 26, 1961, Ser. No. 162,637
Claims priority, application Canada, Oct. 6, 1961, 833,213
2 Claims. (Cl. 324—1)

This invention relates to method and apparatus for making Induced Polarisation measurements. More particularly it relates to method and apparatus whereby Induced Polarisation measurements may be carried out without the necessity for the measuring unit to be in electrical contact with the ground. The measuring unit may thus be transported above the ground by a person, in a vehicle or in an aircraft. It may be inserted into drill holes or moved about in mine openings. The advantages of this invention over the older methods of measurement in ease, speed and economy will be readily apparent.

The Induced Polarisation method of geophysical exploration has come to be widely accepted and used in the search for metallic conducting minerals since the writer's original thesis (Seigel, 1949) provided the experimental proof of its successful application.

Within the literal meaning of the term, polarisation is a separation of charge to form an effective dipolar distribution within a medium. Induced Polarisation is therefore a separation of charge which is due to an applied electric field. It may also include phenomena which cause voltage distributions similar to those due to true polarisation effects. For practical purposes, only polarisation effects with time constants of build up and decay longer than a few milliseconds are of importance. This usually excludes such phenomena as dielectric polarisation and others which are encompassed by the normal electromagnetic equations.

When a metal electrode is immersed in a solution of ions of a certain concentration and valence, a potential difference is established between the metal and the solution sides of the interface. This difference in potential is an explicit function of the ion concentration and valence, etc. When an external voltage is applied across the interface a current is caused to flow and the potential drop across the interface changes from its initial value. If the electrode is a cathode it becomes more negative with respect to the solution, whereas if it is an anode, it becomes more positive with respect to the solution. The change in interface voltage is called the "Overvoltage" or "Polarisation Potential" of the electrode. If the electrode is a cathode, we speak of "Hydrogen Overvoltage" and, if an anode, of "Oxygen Overvoltage."

These Overvoltages are due to an accumulation of ions on the electrolyte side of the interface, waiting to be discharged. The charge of these ions will be balanced by an equal opposite charge due to electrons or protons on the electrode side of the interface. For small current densities the Overvoltage is proportional to the current density, i.e., is a linear phenomenon. The variation of Overvoltage with several other factors is presented in the writer's Doctoral Thesis (Seigel, 1949). The time constant of build up and decay is of the order or several tenths of seconds.

Overvoltage is therefore established whenever current is caused to flow across an interface between ionic and electronic conduction. In normal rocks the current which flows under the action of an impressed E.M.F. does so by virtue of ionic conduction in the electrolyte in the capillaries of the rock. There are, however, certain rock forming minerals which have a measure of electronic conduction, and these include almost all the metallic sulphides (except sphalerite), graphite, some oxides such as magnetite and pyrolusite, and some arsenides and other minerals with a metallic lustre. When these are present in a rock subjected to an impressed E.M.F., current will be caused to flow across capillary-mineral interfaces and Hydrogen and Oxygen Overvoltages will be established. FIGURE 1 is a simplified representation of what happens to an electronic conducting particle in an electrolyte under the influence of current flow.

Despite a decade of attempts by various workers to investigate the source of non-metallic I.P. in rocks, an adequate explanation of all observed effects is still lacking. A number of possible contributory agents have been established. A group at the New Mexico Institute of Mining and Technology under Victor Vacquier has carefully examined strong polarisation effects due to certain types of clay minerals. These effects are believed to be related to electrodialysis of the clay particles. This is only one type of phenomenon which can cause "ion-sorting" or "membrane effects." Much work remains to be done to determine the various agencies, other than clay particles which can cause such membrane effects.

A second type of phenomenon encompasses electrokinetic effects. This combines electro-osmosis in the capillaries on the "current on" time, the storage of energy in the compression of air bubbles and in hydrostatic heads, and the release of energy in return fluid motion when the current is intercepted. This, in turn, produces voltage gradients through the "Streaming Potential" phenomenon. These voltage gradients will have the same external appearance as true polarisation effects due to separation of charge. Generally speaking, electrokinetic effects seem less important than membrane effects in the overall polarisation picture.

In order to measure I.P. effects in a volume of rock one passes current through the volume by means of two contact points or electrodes and, in the techniques employed to date, measures existing voltages across two other contact points. Theoretically, any time varying current form can be used, but in practice only two such forms are employed. In the first technique a steady current is passed for a period of from one second to several tens of seconds and then abruptly interrupted. The polarisation voltages built up during the passage of the current will decay slowly for at least several seconds after the interception of the current.

FIGURE 2 shows the typical transient I.P. voltage decay forms for various rock forming materials in a laboratory testing apparatus. A primary current time of the order of 21 seconds was employed on these tests. It will be noted that the voltages are plotted against the logarithm of the decay time and are approximate linear functions of log $t$ for reasonable lengths of time ($t$). The amplitude of the transient voltages has been normalized with respect to the steady state voltage existing immediately before the interception of the primary current.

In order to indicate the magnitude of the transient I.P. effects the methods used to date measure one or more characteristics of the transient decay curve and relate it back to the amplitude of the measured primary steady state voltage prior to the interception of the primary current. It may be shown that the ratio of $Vs/Vp$ i.e., peak polarisation voltage to the primary voltage just before interception, is a physical property of the medium which has been called the "Chargeability" of the medium, and is usually designated by the letter "$m$."

The "A.C." or "Frequency Variation" method entails the passage of sine wave currents of low frequencies through the ground. Since polarisation effects take an appreciable time to build up it can be seen that as the frequency is decreased the apparent resistivities or transfer impedances between the current and measuring circuits will increase.

FIGURE 3 shows two typical curves of apparent resistivity and phase angle, of two artificial high pyrite mixtures plotted with respect to the frequency of the applied sinusoidal current form. Both the fact of the variation of apparent resistivity with frequency and the presence of phase angle lags may be used to indicate the presence of I.P. effects, although generally only the first has so been employed.

The A.C. method commonly used entails a comparison of apparent resistivities using sinusoidal alternating current of two or more frequencies, generally within the range of 1/10 to 10 c.p.s. The Induced Polarisation factor for the A.C. method corresponding to the Chargeability is the "Percent Frequency Effect" or P.F.E. defined as $$\frac{R_1-R_2}{R_1}\times 100$$

where $R_1$ and $R_2$ are the apparent resistivities at the lower and higher frequencies, respectively (e.g., ½ and 5 c.p.s.).

Regardless of whether the Transient or Frequency Variation method was used, all methods of measurement to date have depended on making physical contact with the earth by means of electrodes at four contact points. Energising current (D.C. or A.C.) is caused to flow between the "current" contact points and earth voltages are measured between the "potential" contact points. The necessity of making earth contacts is a burdensome one, as good contacts are often difficult to make in areas of rock outcrop, loose debris or dry soil. Moreover, there is the task of laying out and reeling in large amounts of cable. All of this results in a time consuming, labourious and therefore, costly operation.

It appears fundamentally desirable that the energising current should be passed conductively (or galvanically) as opposed to inductively (as eddy currents) through the earth. The latter type of energising current would flow largely in the more highly conductive regions and thus we would get little information about regions other than those which would show up as conductors by an ordinary inductive electromagnetic survey. One of the main functions of the Induced Polarisation method is to indicate the presence of metallic conducting mineralisation under conditions where this mineralisation is too sparse or too poorly interconnected to appreciably increase the overall conductivity. We conclude that one cannot avoid the necessity of conductively passing the energising current into the ground.

There is, however, nothing fundamental about the method of measurement of the Induced Polarisation. It will be shown that magnetic field measurements enable us to measure the Chargeability or other Induced Polarisation characteristics as well as do electric field measurements requiring earth contacts.

For the theoretical basis for the present invention reference should be made to the writer's paper (Seigel, 1959) entitled "Mathematical Formulation and Type Curves for Induced Polarisation." On page 549 of that paper the basis for the entire theoretical presentation was the postulate that the action of the primary electric field in establishing Induced Polarisation effects in a continuous medium is equivalent to the creation of a volume distribution of current dipoles. These dipoles are antiparallel to the field at each point in the medium and have a volume current moment strength (vector notation)

$$\vec{M} = -m\vec{j}$$

where $$\vec{j}$$

is the primary current density vector. The factor $m$ is the "Chargeability" mentioned above. The presentation then carries on to show that for a uniform medium the ratio of the secondary over the primary electric fields or voltages is the same factor $m$. It will now be shown that this same quantity $m$, which is a measure of the Induced Polarisation characteristics of the uniform medium under investigation, may also be obtained from measurements of appropriate magnetic field components.

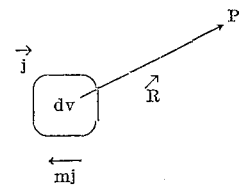

Figure 10

FIGURE 10 will illustrate the mathematical representation. The primary magnetic vector field contribution at the point P due to a small volume $dv$ in which the current density vector is $$\vec{j}$$

is given by Ampere's law (in M.K.S. units) by $$d\vec{H}p = \frac{\vec{j}\times\vec{R}}{R^3}dv$$

where $$\vec{R}$$

is the vector from the volume element to the point P. The total primary magnetic field at the point P may therefore be expressed by $$\vec{H}p = \int_V \frac{\vec{j}\times\vec{R}}{R^3}dv \qquad (1)$$

where V is the entire volume in which currents flow. In a practical field case V will include the entire earth and also the discrete cables carrying the energising current from the generator to the ground contact points.

On page 552 of the last reference it is shown that the current dipole Induced Polarisation representation results in a reversed or opposing (antiparallel) current flow of strength $-mj$. The secondary magnetic field vector, at the point P due to these polarisation currents is thus expressed in a manner similar to that used for $$\vec{H}p$$

as $$Hs = -\int_V \frac{m\vec{j}\times\vec{R}dv}{R_3} \qquad (2)$$

If we measure one or more components of $$\vec{H}p$$

which are only due to current flow in the earth and are not contributed to by the cables, and if we are dealing with a medium of uniform Chargeability, then $$\vec{H}s = -m\int_V \frac{\vec{j}\times\vec{R}}{R_3}dv = -m\vec{H}p \qquad (3)$$

and the ratio of the secondary to primary magnetic field components becomes $Hs/Hp = -m$, i.e., is numerically equal to the same Chargeability factor that has been heretofore determined by measuring the electric field or voltages on the ground.

Thus, in order to derive Induced Polarisation characteritsics through magnetic field measurements we must measure and compare the magnetic fields due to the normal current flow and the polarisation current flow.

This invention will be readily understood after reference to the following detailed description read in conjunction with the drawings.

In the drawings:

FIGURES 1, 2, 3 and 10 have been described above.

Using the transient approach, several methods of measuring the primary and secondary magnetic fields will be presented, although it is apparent that other means and methods to accomplish the same purpose can be devised by those skilled in the art.

Figure 4:
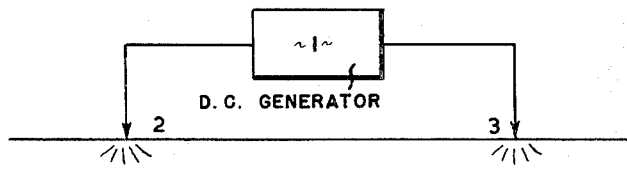
FIGURE 4 shows a schematic representation of the manner in which current is caused to pass through the earth to establish Induced Polarisation effects in one embodiment of the invention.
Figure 5:
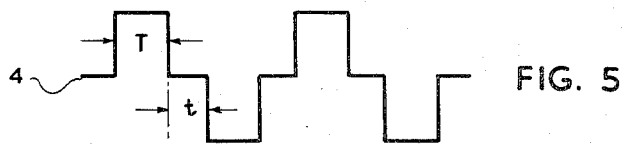
FIGURE 5 shows the current wave form passed through the earth in one embodiment of the invention.

FIGURE 4 shows one such means in block diagram. Item 1 is a D.C. generator whose output is fed through two contact points 2 and 3 into the ground. The current form generated is the cyclic alternating square wave 4 of FIGURE 5. The current is put on for a time T, off for a time $t$, on and reversed for time T and off for time $t$. The cycle is then repeated. The times T and $t$ may be of the order of a few milliseconds to a few seconds. The fact that the current is reversed is not strictly necessary to this development but has certain practical advantages.

Figure 6:
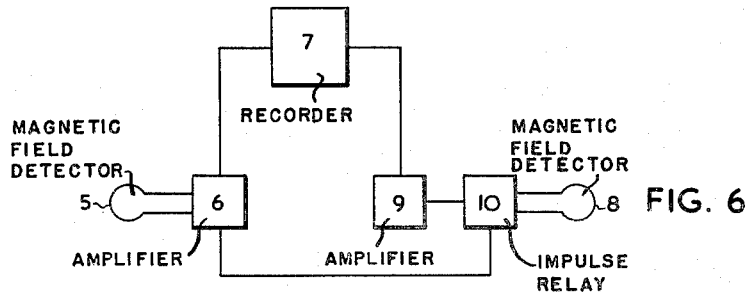
FIGURE 6 shows in block diagram form the detecting and measuring means in one embodiment of the invention.

In FIGURE 6 item 5 is a magnetic field detector whose function is to pick up the primary magnetic field H$p$ which is present during the current-on time T. This detector may be a multiturn coil, a fluxgate or alkali vapour magnetometer or other magnetic field sensitive element. The output of detector 5 is fed into an appropriate amplifier 6 and the output of 6 in turn is fed into one channel of a recorded 7. If detector 5 is a coil which indicates the rate of change of the magnetic field, then the output of 6 will be integrated prior to being fed into recorder 7. In any case the one channel of the recorder 7 will present a trace similar in form to the primary current wave form 4 and whose amplitude is proportional to the magnetic field detected by 5.

Item 8 is a second magnetic field detector which is connected to a second amplifier 9. Detector 8 is so disposed as to measure the same magnetic field component as detector 5, but is switched on to 9 only during the current-off time $t$. The switching may be accomplished in one of several ways. For example, the sharp voltage pulse generated in detector 5 by the abrupt interception of the primary current pulse may be employed to close an impulse relay 10 connecting detector 8 to the amplifier 9. A self-contained timing mechanism in 10 serves to open the circuit once again in advance of onset of the next current pulse. Alternatively, radio signals can be transmitted from the main cycle timer controlling the current cycle of generator 1, can be received at the measuring location and used to connect detector 8 only during the current-off time.

If detector 8 is a coil, measuring rate of change of magnetic field, then the output of amplifier 9 may be integrated to restore it to a function proportional to the magnetic field. For many applications it is satisfactory to merely present on output proportional to the rate of change of the Induced Polarisation transient magnetic field. This is so since it is generally found that the Induced Polarisation transients are similar in shape and differ mainly in amplitude. Under these circumstances the rate of change of the magnetic field transient will be proportional in amplitude to the magnetic field transient itself.

In any case the output of amplifier 9 is ultimately fed into a second channel of recorder 7 and thereon portrayed.

The high voltage D.C. produced by generator 1 is often derived by full-wave rectification of the output of an A.C. generator, after transformer step-up. There is sometimes little filtering of the (second harmonic) A.C. component of this output so that the primary current then contain a large A.C. component whose amplitude is proportional to the D.C. component. Detector 5 may then be employed to measure the amplitude of the A.C. magnetic field component. It may be tuned to this frequency, for example, resulting in an increase of sensitivity.

Figure 7:
FIGURE 7 shows a representation of the voltage form which is used to determine the characteristics of the transient magnetic fields, in one embodiment of the invention.

The output of amplifier 6 is similar in form to item 4. The amplitude of the output is then proportional to H$p$. In FIGURE 7 item 11 shows a typical trace portraying the output of amplifier 9. This output curve form is related in amplitude to the amplitude of the Induced Polarisation magnetic field H$s$. The ratio of these two amplitudes is thus directly related to $Hs/Hp$, i.e. to the average Chargeability $m$ of the region under investigation.

In practice, the earth contact points 2 and 3 may be a considerable distance apart, up to a few miles. They are left fixed while the entire measuring unit is transported in the region about and between the contact points. The direct magnetic field from the cables is minimised by measuring horizontal field components only, as the cables give rise to mainly vertical magnetic fields near the ground surface. It is obvious that the recorder is necessary only when the measuring unit is being continuously transported, as in an aircraft or vehicle when measuring. For discrete readings the recorder may be replaced by two output meters or oscilloscopes.

Figure 1:
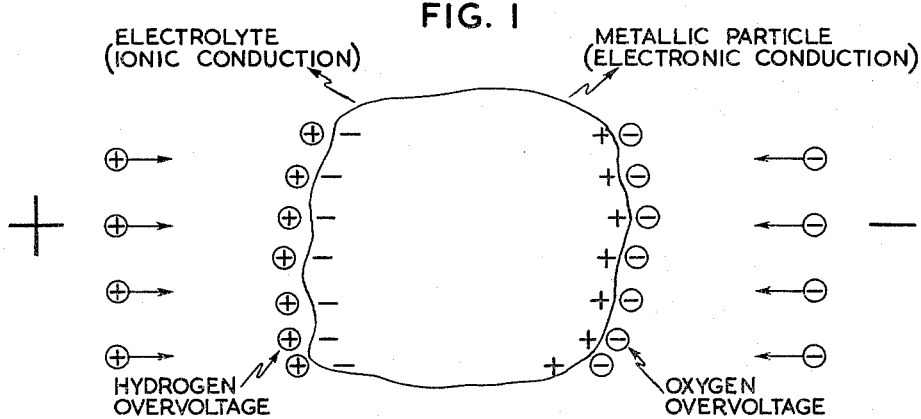
Figure 2:
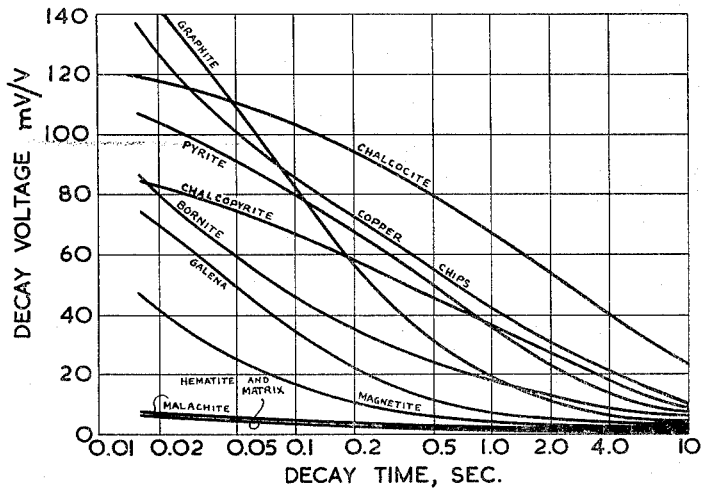
Figure 3:
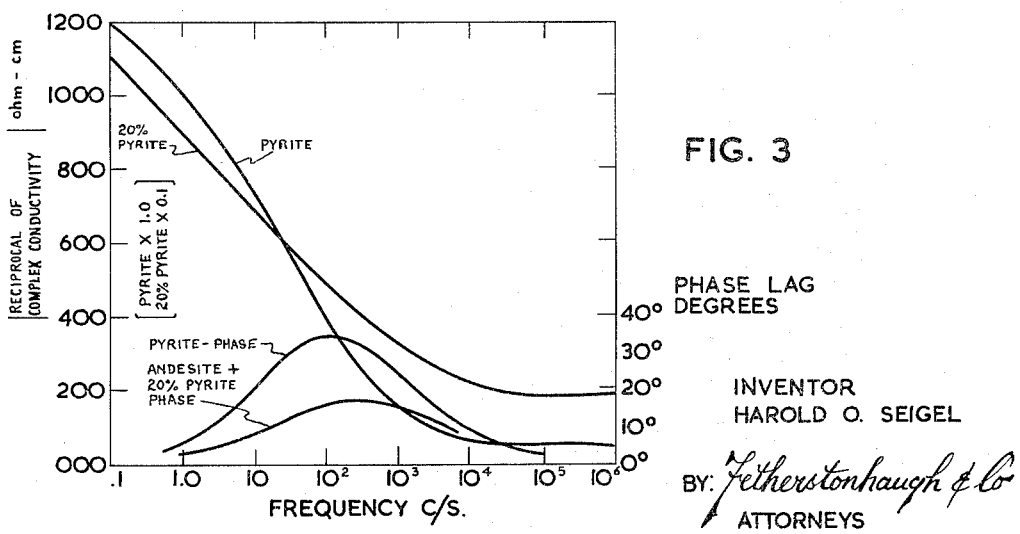

Using the A.C. or continuous wave approach a radically different type of method may be used to derive Induced Polarisation characteristics. Referring back to FIGURE 3 we note that, for materials of high polarisation there is a large effective phase lag of the voltage with respect to the applied current. Thinking of this in another way, the current leads the applied voltage. It may be shown theoretically (Wait, 1959) that, for a given frequency, the phase angle difference between the current and voltage is directly related to the Chargeability factor $m$. The same phase difference would, therefore exist between the alternating magnetic field due to the current flow and the ground voltages.

Figure 8:
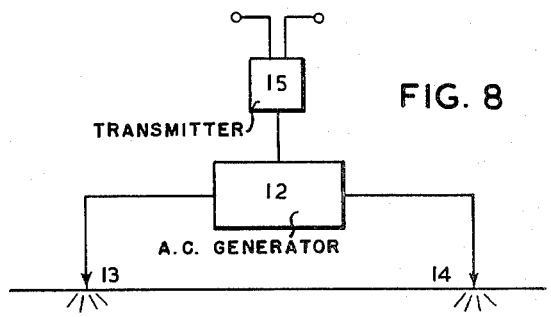
FIGURE 8 shows a schematic representation of the manner in which current is caused to pass through the earth to establish Induced Polarisation effects in another embodiment of the invention.

FIGURE 8 shows an embodiment of a form of the invention which utilises the presence of the phase difference to measure Induced Polarisation effects.

Figure 9:
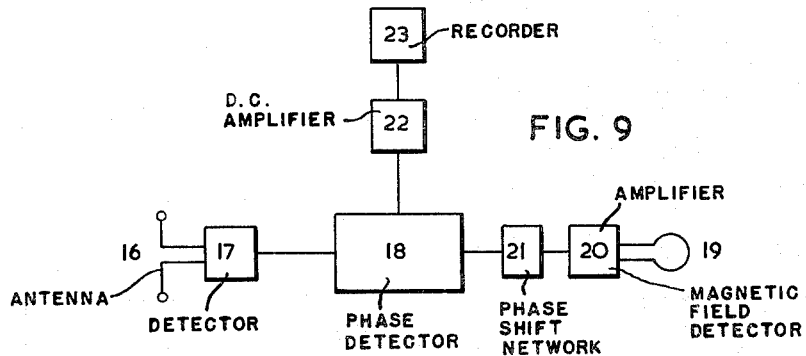
FIGURE 9 shows, in block diagram form, the detecting and measuring means in another embodiment of the invention.
Figure 10:
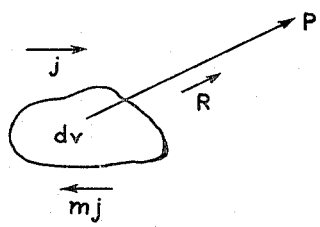

Item 12 is an A.C. generator which produces a sine wave output with a very low harmonic content, at a frequency in the range of 0.1 c.p.s. to 100 c.p.s. This current is passed into the ground through contact points 13 and 14. Item 15 is a transmitter which transmits a radio frequency carrier modulated by the main generator current and in-phase with it. FIGURE 9 shows in block diagram form the detecting and measuring means for this embodiment. Item 16 is an antenna which picks up this radio frequency reference signal and feeds it into the detector 17 which produces an output proportional to the modulating signal. This low frequency output is then fed into one side of a phase detector 18. Item 19 is a low frequency magnetic field detector, which picks up the alternating magnetic field due to ground current flow. Item 19 may be a coil of wire, or may be any other magnetic field sensitive device such as described above. The output of 19 is fed into the amplifier 20, through a phase shift network 21 and thence into the second side of the phase sensitive detector 18. The output of the phase sensitive detector 18 is amplified by the D.C. amplifier 22 and fed into recorder 23.

In practice, the current contact points 13 and 14 may be up to several miles apart. They are left fixed while the measuring unit only is transported on the ground or in the air in the region about and between the contact points. The horizontal magnetic field components are measured to minimise the effect of current flow in the cables. The function of the phase shift network 21 is to compensate for phase shifts existing in the electronic circuitry. It may be set by bringing the detector 19 close to one of the current cables so that the received signal will be predominantly in-phase with the current in the ground. The phase shift network 21 is then adjusted for zero output of the phase meter 18.

It is obvious that if the measuring unit is not to be continuously carried about the recorder may be replaced by an output meter.

Whereas the foregoing disclosure specifically relates to the detection of naturally occurring electronically conducting materials in the earth, it is more generally applicable to the detection of any type of electronically conducting material in an ionically conducting medium; for example, metal bodies in salt or fresh water or metal bodies buried in the earth.

What I claim as my invention is:

1. A method of prospecting comprising; creating a polarized condition in the medium being explored by passing an electric current through the medium, measuring the magnitude of the steady-state magnetic field created by the said electric current used to create the said polarized condition during the passage of said electric current through the medium to be explored; abruptly terminating the said electric current and thereafter measuring the magnitude of the transient magnetic fields due to the said polarized condition during the decay period and determining the ratio of the said two measurements as a measure of the induced polarization characteristics of the medium.

2. A method of prospecting as claimed in claim 1, in which said steps are repeated.

References Cited by the Examiner
UNITED STATES PATENTS

| | | | |
|---|---|---|---|
| Re. 24,464 | 4/58 | Yost | 324—1 |
| 2,231,013 | 2/41 | Klipsch et al. | 324—1 |
| 2,730,673 | 1/56 | Jakosky | 324—7 |
| 2,735,980 | 2/56 | Wait | 324—7 |

WALTER L. CARLSON, *Primary Examiner.*